(12) United States Patent
Hochmuth et al.

(10) Patent No.: US 6,491,150 B1
(45) Date of Patent: Dec. 10, 2002

(54) SWITCHABLE SILENT RATCHET

(75) Inventors: Harald Hochmuth, Hagenbuchach (DE); Dirk Quitzrau, Nuremberg (DE)

(73) Assignee: Ina Walzlager Schaeffler OHG, Herzogenaurach (DE)

( * ) Notice: Subject to any disclaimer, the term of this patent is extended or adjusted under 35 U.S.C. 154(b) by 0 days.

(21) Appl. No.: 09/806,588

(22) PCT Filed: Sep. 14, 1999

(86) PCT No.: PCT/EP99/06793

§ 371 (c)(1),
(2), (4) Date: Jun. 15, 2001

(87) PCT Pub. No.: WO00/20247

PCT Pub. Date: Apr. 13, 2000

(30) Foreign Application Priority Data

Oct. 2, 1998 (DE) .......................... 198 45 365

(51) Int. Cl.$^7$ .............................. B60N 2/22; B60N 2/44
(52) U.S. Cl. .............................. 192/51; 192/38; 192/39; 192/44
(58) Field of Search .............................. 192/38, 39, 44, 192/71, 74, 75, 48.3, 51

(56) References Cited

U.S. PATENT DOCUMENTS

| | | | |
|---|---|---|---|
| 2,633,213 A | | 3/1953 | Houplain |
| 2,873,832 A | | 2/1959 | Helm |
| 3,369,638 A | | 2/1968 | Hunt et al. |
| 4,371,065 A | * | 2/1983 | Engels et al. ............ 192/12 BA |
| 4,533,027 A | * | 8/1985 | Otani et al. .................. 188/166 |
| 5,460,253 A | * | 10/1995 | Ritter et al. ............. 192/223.2 |
| 5,522,488 A | * | 6/1996 | Schwarzbich ................ 192/101 |
| 5,593,210 A | * | 1/1997 | Schwarzbich ............. 192/223.2 |
| 5,794,479 A | * | 8/1998 | Schwarzbich ............. 192/223.2 |
| 5,896,973 A | | 4/1999 | Hochmuth et al. |
| 6,032,777 A | * | 3/2000 | Denis ....................... 192/223.2 |
| 6,273,233 B1 | * | 8/2001 | Denis ....................... 192/223.2 |

FOREIGN PATENT DOCUMENTS

| | | |
|---|---|---|
| DE | 469451 | 11/1928 |
| DE | 499473 | 5/1930 |
| DE | 1735420 | 5/1955 |
| DE | 1798512 | 10/1958 |
| DE | 3203151 A1 | 8/1983 |
| DE | 9408426 U1 | 6/1995 |
| DE | 19726257 A1 | 1/1998 |
| EP | 0502774 A1 | 9/1992 |
| WO | WO9620352 | 7/1996 |

\* cited by examiner

*Primary Examiner*—Saul Rodriguez
(74) *Attorney, Agent, or Firm*—Volpe and Koenig, P.C.

(57) ABSTRACT

A switchable clamp-type locking mechanism with an output shaft (3) that rotates in relation to a housing (1) is provided. Furthermore, clamping elements, in particular clamping balls or clamping rollers (4) are provided that are pushed by a spring force into a clamping gap (16) in their clamped position and are confined by a smooth track (15) on the housing (1) and by locking ramps (13, 14) on the output shaft (3). A drive shaft (2) to rotate the output shaft (3) is provided. The clamping elements are moved into a release position using a device by means of which the clamping elements are freed to rotate the output shaft (3). A slide (7) that is fixed to the output shaft (3) is form-locked to the housing (1) in the clamped position of the clamping elements and is disengaged from the housing (1) in the release position of the clamping elements.

7 Claims, 4 Drawing Sheets

SWITCHABLE SILENT RATCHET

BACKGROUND

This invention pertains to a switchable clamp-type locking mechanism. In this type of clamp-type locking mechanism, an output shaft is locked against rotating in either rotational direction with respect to a rotatably fixed part, in particular a housing, when a rotational moment is introduced to the output shaft. These types of clamp-type locking mechanisms often provide a drive means that transmits a rotational moment to the output means so that elements that are connected to the output shaft can be activated. In the transfer of rotational moment from the drive to the output means, the clamped connection between the output shaft and the rotatably fixed part is released in the selected direction of rotation. Switchable clamp-type locking mechanisms can, for example, be used in gear units that have an output shaft fixed in both rotational directions when a rotational moment is introduced to this output shaft. Such gear units are, for example, used in automobile seat adjustment systems or in devices to raise or lower windows in automobiles. In these cases, a rotational moment introduced from the outside to the output shaft, i.e. the load imposed on the seat by a person, for example, is taken up by a housing, for example, so that no rotational motion of the output means occurs.

From WO 96/20352 A, for example, a clamp-type locking mechanism is known that is provided in a seat height adjustment system. The clamp-type locking mechanism has two self-enclosed elements, the outer element of which is designed as a housing having a cylindrical track on its interior wall surface and the other element of which is designed as an output shaft whose external surface facing the cylindrical track is provided with a number of locking ramps with opposite slopes distributed along the perimeter. Each locking ramp forms a wedge-shaped clamping gap with the cylindrical track. A spring force pushes clamping rollers into this clamping gap. Since the virtual peaks of these wedge-shaped clamping gaps either face toward or away from one another, the clamping rollers that are pushed by a spring force into the clamping gap prevent a rotational motion of the inner element with respect to the outer element in both rotational directions. The clamping rollers are pushed by a spring force into the clamping gap in their clamped position and engage with the locking ramps and the cylindrical track. When the clamping rollers are freed, i.e. when they are located in the released position, only those clamping rollers that are functionally relevant to this rotational direction are freed. The clamping rollers are located in the pocket of a cage with play in the perimeter direction, wherein the cage can be tilted with respect to the inner element just a bit. This tilting path is used to free the clamping rollers from their associated clamping gaps. A rotational moment acts on the inner element, which is caused by a force acting on the seat. In the clamped position, these types of clamp-type locking mechanisms hold the seat in its adjusted height.

Now, it is conceivable that not only static rotational moments can act on these types of clamp-type locking mechanisms in their clamped position, but also oscillating, dynamic loads with alternating rotational moments. If these types of clamping mechanisms are provided in automobiles, for example in seat adjustment systems, vibrations in the internal combustion engine can generate these types of loads. In an alternating load of this type, for example, the clamping force of the above clamp-type locking mechanism that is transmitted from the inner element to the outer element through the clamping rolls in their clamped position is first reduced until the alternating load reaches a value at least approaching zero. The rotational moment imposed between the working shaft and the housing can be reduced under this oscillating load to approximately 18 Nm or less. In this situation, of course, the clamping rollers are still being pushed by the spring force into their clamping gaps by means of the springs provided, but relative shifts are possible here between the inner element and the outer element due to the reduced clamping effect under the alternating load. As a result, an undesired slip can occur. In case of the seat height adjustment system, these types of relative shifts can result in the seat height undergoing an unwanted change.

SUMMARY

The object of this invention is thus to securely prevent a slip between the clamped elements in switchable clamp-type locking mechanisms.

According to the invention, this object is met in that a slide that is fixed to the output shaft is form-locked to the rotatably fixed part in the clamped position of the clamping elements and disengages with the rotatably fixed part in the released position of the clamping elements. In the clamped position of the clamping elements, a rotational moment can be introduced to the output shaft and can be transferred through the clamping elements to the rotatably fixed part. In addition to this, a form-locked connection between the output means and the housing exists to prevent an undesired slip, as a result of oscillations, between the output means and the rotatably fixed part, for example the housing. The form-locked connection can be designed for small loads since most of the load is transmitted through the clamp-type locking mechanism and not through the form-locked connection between the output means and the housing. In case of oscillating or alternating loads that approach zero or pass through this value, the form-locked connection will be subjected to these minimum dynamic loads, preferably where zero is crossed. Of course, the form-locked connection can be designed to withstand maximum occurring rotational moments.

In a clamp-type locking mechanism according to the invention, the housing can be provided with a cylindrical track on its inner perimeter and the output shaft can be provided with the locking ramps on its outer perimeter. It is also possible to design the output shaft as a hollow shaft and to design the locking ramps into the inner perimeter of the hollow shaft and to design the cylindrical track at the outer perimeter of a part of the axis of the housing. Furthermore, it is possible for the locking ramps to be designed at the back of the output shaft and for the flat, circular closed track to be designed at the back of the housing. In any case, the track associated with the housing is flat in the sense that it is either flat or has a smooth bend.

A further development according to the invention provides that a mechanism is located between the drive shaft and the slide to convert a rotational motion of the drive shaft into a longitudinal shift of the slide. The rotational motion of the drive shaft is thus first used to release the form-locked connection between the slide and the housing by shifting the slide. The continued rotational motion of the drive shaft is transmitted to the output shaft.

Another further development according to the invention provides that a ramp is provided at the slide and an attachment for the ramp is provided at the drive shaft and at a distance from the rotating axis of the drive shaft. As the drive shaft rotates, the attachment B for example a pin located coaxial to the drive shaft B is turned in the circumferential direction. Since the slide is initially locked to the housing, it cannot follow the turning of the pin in the circumferential direction, resulting in the pin pressing up against the ramp. Under the force of the pin pushing against the ramp, the slide, which can shift lengthwise, now is forced to shift because the ramp—and thus the slide—slides along the pin until the slide finally is disengaged from the housing. Then, the continued rotation of the drive shaft can be transmitted to the output shaft. The slope of the ramp determines the length of the path of the slide relative to the amount of the rotational angle of the drive shaft.

The slide can be made to move parallel to the output shaft. In this case, the ramp is provided at the back of the slide. The slide can also be made to move perpendicular to the output shaft. In this case, the ramp is tilted at an angle to the axis along which the slide is shifted. The virtual extension of the ramp then intersects the axis at an angle that determines the ratio between the distance that the slide shifts relative to the rotational angle of the output shaft. Two ramps with opposite slopes can cooperate with the attachment on the drive shaft. This has the advantage in that the slide can be shifted in a common longitudinal direction in both rotational directions of the drive shaft so as to release the form-locked connection between the output shaft and the housing. The ramp can also be provided at the output shaft and the attachment can be provided at the slide. This type of arrangement provides the same advantages described since this case is just the reverse arrangement of ramp and attachment.

Another further development according to the invention provides that the radially moving slide is provided with a triangular cut-out perpendicular to the drive shaft, wherein two abutting walls in the triangular cut-out each form one ramp. The virtual extensions of the ramps intersect the axis along which the slide moves. It is preferred that the ramps intersect this axis at the angle so that these virtual extensions intersect this axis at a common point. As a result, a radial movement of the slide is forced to occur in a common direction from both rotational directions of the drive shaft as has already been described in detail above.

In an advantageous manner, the clamp-type locking mechanism according to the invention can be provided with a spring so that moving the slide to release the form-locked connection occurs against the force of this spring. The advantage in this is that the slide automatically springs back under the return force of the spring and produces a form-locked connection between the output shaft and the housing if no rotational moment is introduced to the drive shaft.

The form-locked connection can, for example, be produced by providing teeth on both the slide and the housing, with the teeth engaging into each other to produce the form-locked connection. The smaller the distance between teeth, the more positions are available for the slide to produce the form-locked connection.

BRIEF DESCRIPTION OF THE DRAWINGS

Below, the invention is explained in more detail on the basis of the preferred embodiments. In the drawings.

DETAILED DESCRIPTION OF THE PREFERRED EMBODIMENTS

Figure 1:
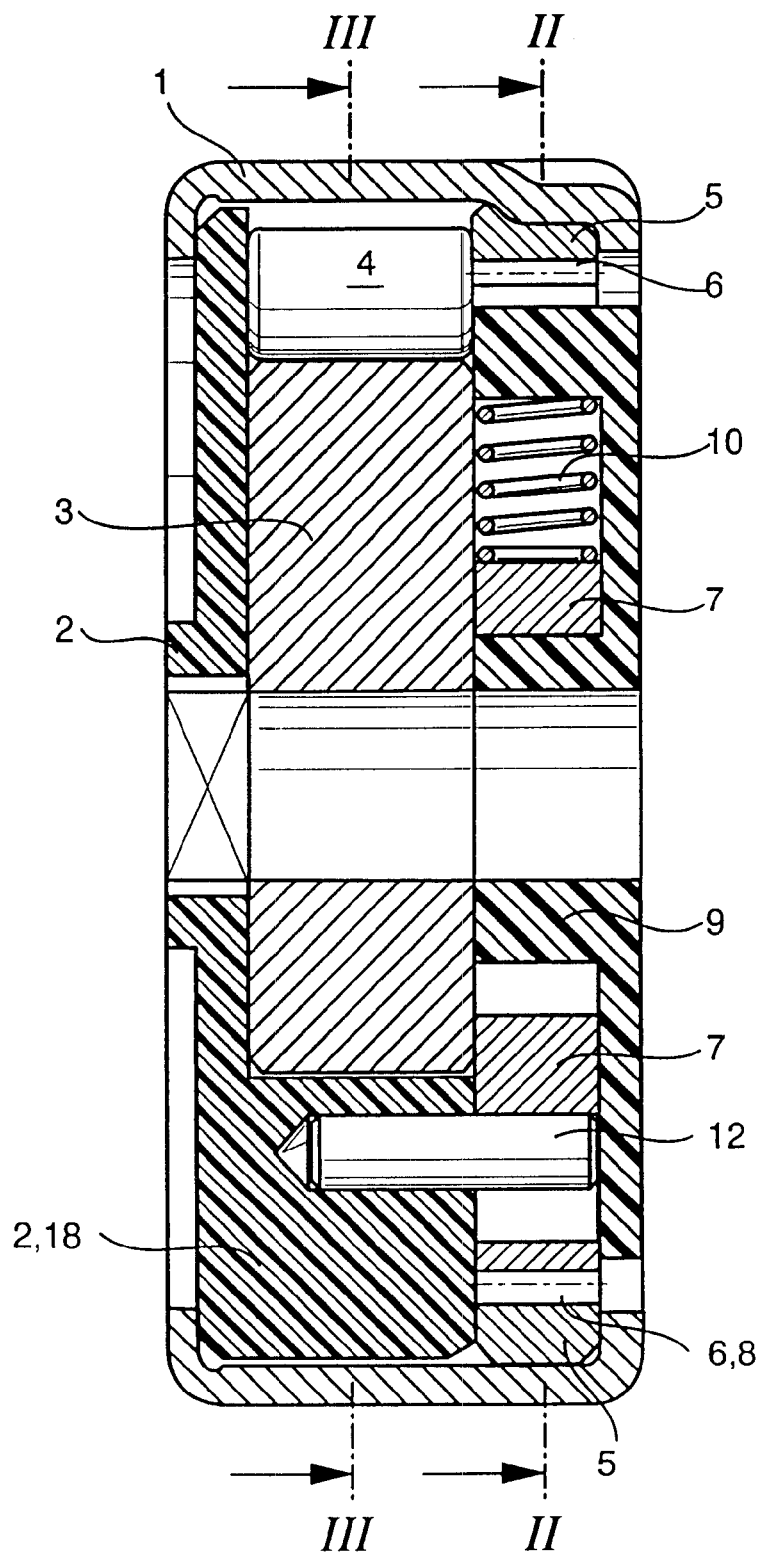
FIG. 1 is a longitudinal section view through clamp-type locking mechanism according to the invention.

The clamp-type locking mechanism according to the invention as shown in FIG. 1 has a hollow cylindrical housing 1 in which a drive shaft 2 and an output shaft 3 are located coaxially with respect to one another. Between the housing 1 and the output shaft 3, there are clamping rollers 4 by means of which a rotational moment introduced from the outside to the output shaft 3 can be transmitted to housing 1.

A ring gear 5 is fixed to the housing land is located adjacent to the clamping rollers 4 in the axial direction. The ring gear 5 is provided with teeth 6 along its inner perimeter. A slide 7 that moves radially is also provided with teeth 8 designed to engage with the teeth 6 of the ring gear 5.

Figure 2:
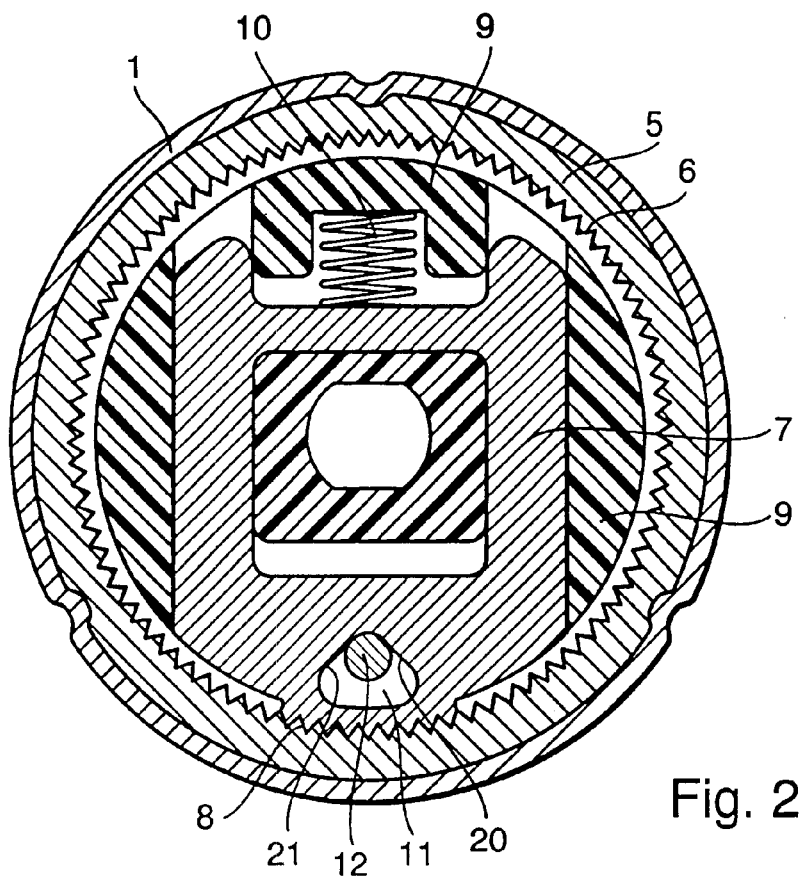
FIG. 2 is a cross-sectional view through the clamp-type locking mechanism according to the invention shown in FIG. 1 taken along line II—II in FIG. 1.

The slide 7 is clearly shown in FIG. 2. The slide 7 moves lengthwise, held in a guide 9. The guide 9, which is made of plastic, is fixed to the output shaft 3. Between the slide 7 and the guide 9 is a compression spring 10 that holds the slide 7 in a form-locked connection with the housing 1, wherein the teeth 6, 8 of the ring gear 5 and the slide 7 are engaged with one another. The slide 7 is provided with a triangularly shaped cutout 11 into which a pin 12 protrudes that is fixed to the drive shaft 2.

Figure 3:
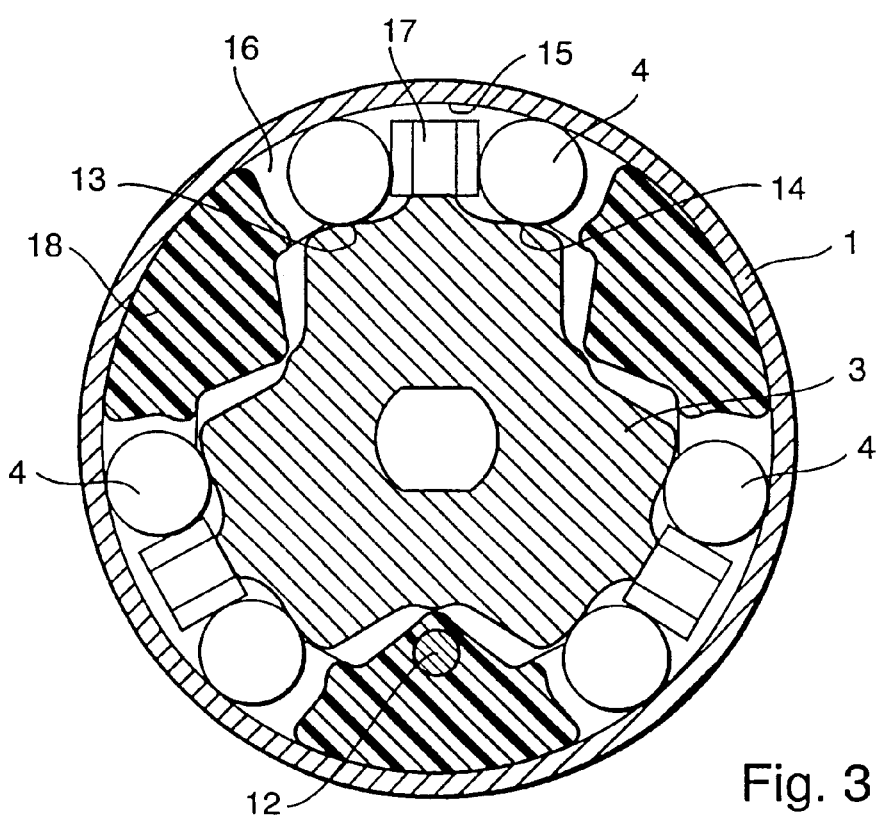
FIG. 3 is another cross-sectional view taken along line III—III in FIG. 1.

FIG. 3 shows the arrangement of the clamping rollers 4 and their interaction with the output shaft 3 and with the housing 1. The output shaft 3 is provided with locking ramps 13, 14 wherein a locking ramp 13 and its respective adjacent locking ramp 14 are provided with opposite inclines. The inner perimeter of the housing 1 is provided with a cylindrical track 15. The cylindrical track 15 and the locking ramps 13, 14 form a confined clamping gap 16, into which a spring force pushes the clamping rollers 4. Between the adjacent clamping rollers 4 of each pair of clamping rollers, is a compression spring 17 that pushes the clamping rollers 4 into the clamping gap 16 and thus holds them in a permanently clamped position. The drive shaft 2 is provided with three fingers 18 distributed along the perimeter, each of which extends between two adjacent pairs of clamping rolls with play in the circumferential direction.

Figure 4:
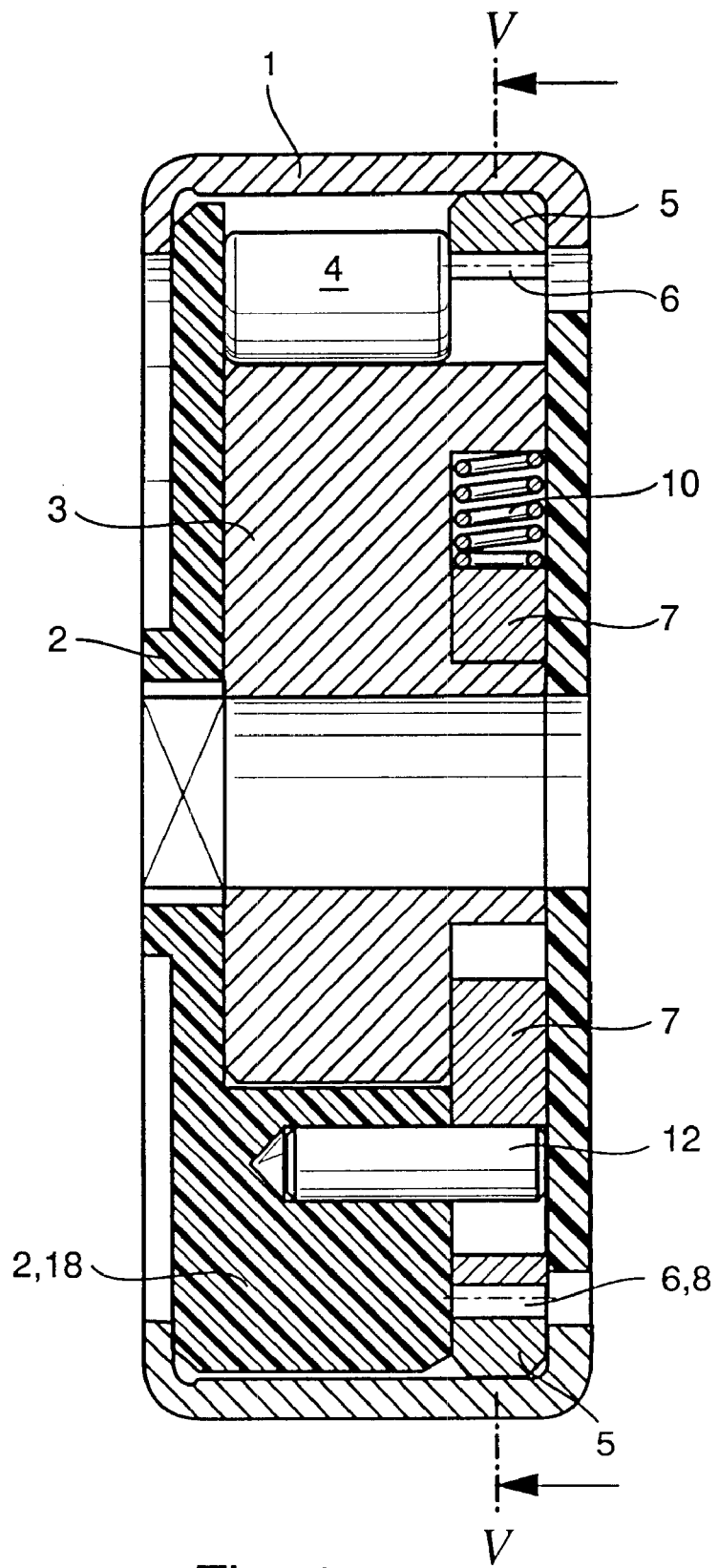
FIG. 4 is a longitudinal section view through another embodiment of a clamp-type locking mechanism according to the invention.
Figure 5:
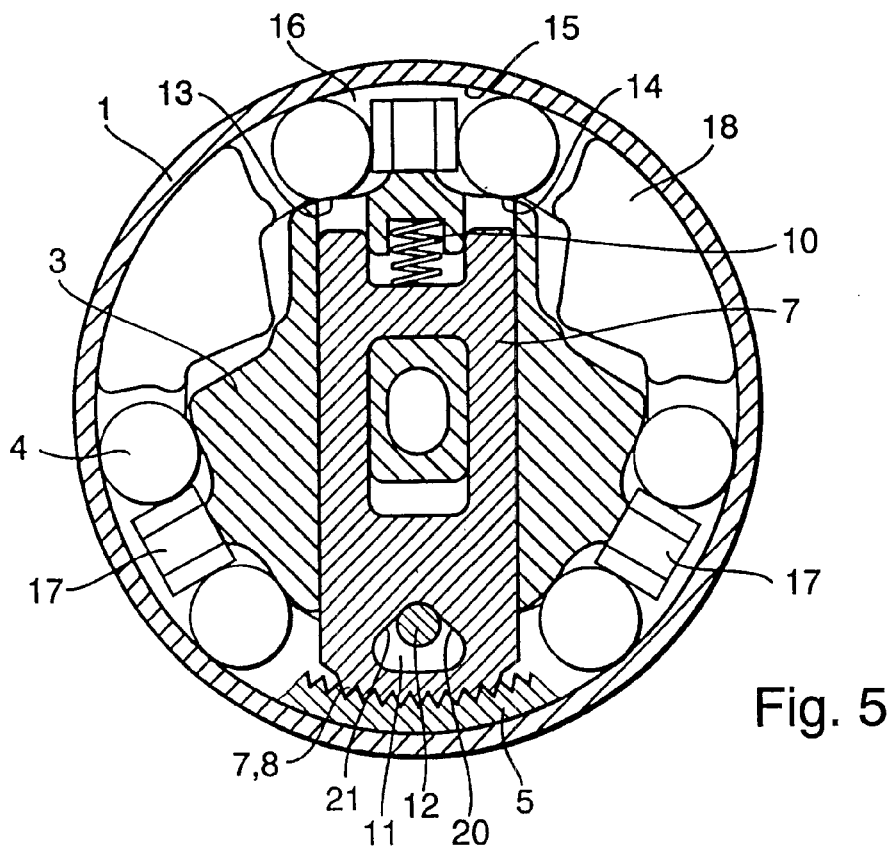
FIG. 5 is a cross section through the clamp-type locking mechanism according to the invention shown in FIG. 4 taken along line V—V.
Figure 6:
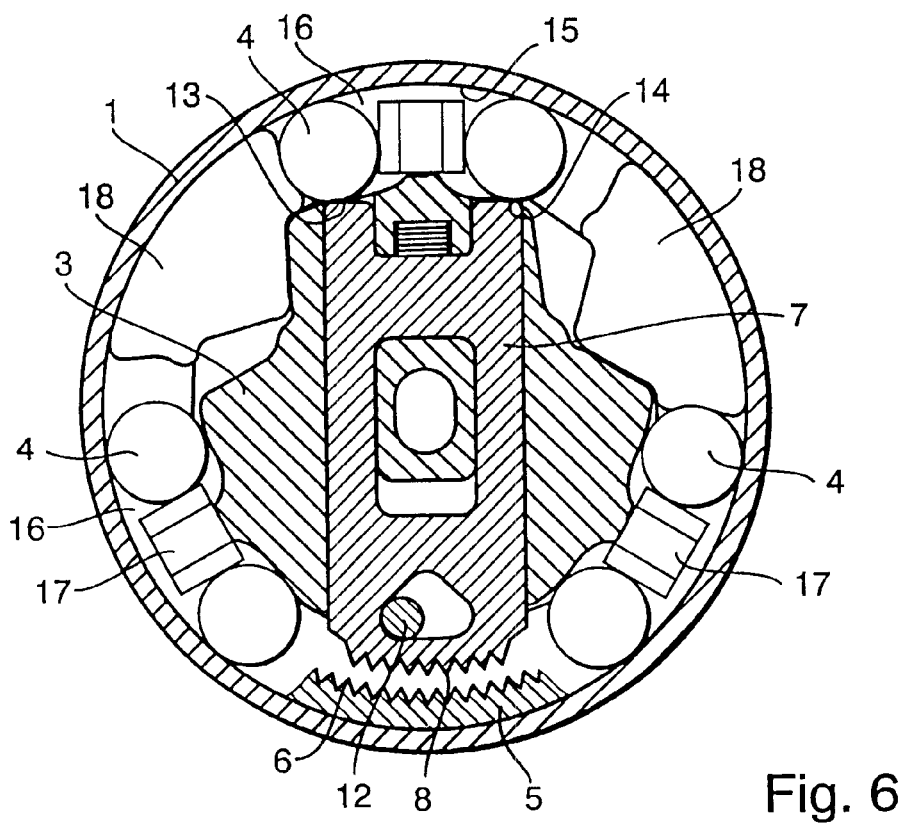
FIG. 6 is the clamp-type locking mechanism according to the invention as shown in FIG. 5, showing the form-locked connection released.

FIGS. 4 through 6 show another clamp-type locking mechanism according to the invention that differs from the clamp-type locking mechanism according to the invention described above in that a separate guide is not necessary for the slide. This is clearly seen in FIG. 5, which shows the slide 7, wherein a guide 19 is connected to the output shaft 3 in a single piece. The way in which this invention works is explained in more detail below using FIGS. 5 and 6.

FIG. 5 shows the clamp-type locking mechanism according to the invention in a position in which no rotational moment is being exerted at the drive shaft 2. The fingers 18 of the drive shaft 2 stay in a neutral position in the center between two adjacent pairs of clamping rollers. The form-locked connection between the output shaft 3 and the housing 1 is produced when the teeth 8 of the slide 7 engage with the teeth 6 of the ring gear 5. In this situation, the pin 12, which is fixed to the drive shaft 2, is located at the base of the triangular cutout 11. Two walls that meet at the base of the triangular cutout 1 each form one ramp 20, 21 for the pin 12.

In order to convey a rotational motion from the drive shaft 2 to the output shaft 3, the form-locked connection and the clamp-locked connection between the output shaft 3 and the housing 1 must be released. If the drive shaft 2 is turned under the influence of a rotational moment imposed on it, the pin 12 is rotated to the side. If the rotational moment occurs in a clockwise direction, the pin 12 pushes against the ramp 21 of the slide 7. Under this rotational moment load, the slide 7 is forced to move radially so that the ramp 21 can move along the pin 12, which itself is moving along a circular path in the circumferential direction together with the drive shaft 2. This forced radial shift of the slide 7 occurs against the spring force of the compression spring 10.

FIG. 6 shows the situation in which the pin 12 has come to rest at the end of the ramp 21. The slide 7 is disengaged from the housing 1. In this situation, the fingers 18 of the drive shaft 2 keep those clamping rollers 4 that would prevent the rotation of the output shaft 3 disengaged from the locking ramps 13 and the cylindrical track 15. Also in this situation, the fingers 18 push against the output shaft 3 so that the continued rotational motion of the drive shaft 2 is directly transmitted to the output shaft 3. The distance that the fingers 18 take to free the clamping rollers 4 before the fingers 18 push against the output shaft 3 on the one hand, and the ramp path that the pin 12 takes until the form-locked connection between the housing 1 and the output shaft 3 is released on the other hand are matched so that the output shaft 3 is pushed by the drive shaft 2 only when the form-locked connection between the housing 1 and the output shaft 3 is released.

If the rotational moment of the drive shaft 2 is stopped, the fingers 18 of the drive shaft 2 are returned to their neutral position. Under the return force of the compression spring 10, the slide 7 is now radially shifted until its teeth 8 engage with the teeth 6 of the ring gear 5.

If the clamp-type locking mechanism described according to the invention is used in seat height adjustment systems in automobiles, for example, the advantages are apparent: the output shaft 3 is subjected to the weight of the seat and a person who may be sitting on it in a manner that exerts a rotational moment. Normally, this rotational moment is transmitted through the clamping rollers 4 to the housing 1. If the seat is not occupied, the rotational moment that is imposed on the output shaft 3 is reduced. If this rotational moment now has oscillating loads superimposed on it that, for example, are caused by the vibrations of the internal combustion engine, it is possible that the ability of the clamping rollers 4 to lock is not permanently ensured. In this case, a slip would occur that in the case of the seat height adjustment system would result in an unwanted change in the seat height. Now, this unwanted shift is prevented by the form-locked connection between the drive shaft and the housing 1 as described above.

Reference List

1. Housing
2. Drive shaft
3. Output shaft
4. Clamping rollers
5. Ring gear
6. Teeth
7. Slide
8. Teeth
9. Guide
10. Compression spring
11. Triangular cutout
12. Pin
13. Locking ramp
14. Locking ramp
15. Cylindrical track
16. Clamping gap
17. Compression spring
18. Finger
19. Guide
20. Ramp
21. Ramp

What is claimed is:

1. A switchable clamp locking mechanism comprising an output shaft (3) that rotates with respect to a rotatably fixed part, comprising a housing (1), with clamping elements, formed from clamping rollers (4), that are pushed by a spring force into a clamping gap (16) in a clamped position, and are confirmed by a smooth track (15) on the rotatably fixed part and by locking ramps (13, 14) on the output shaft (3), a drive shaft (2) to turn the output shaft (3) and a device to move the clamping elements into a released position in which the clamping elements are released to allow the output shaft (3) to turn, a slide (7) connected to the output shaft (3) is locked to the rotatably fixed part in the clamped position and is disengaged from the rotatably fixed part in the released position of the clamping elements.

2. A switchable clamp locking mechanism according to claim 1, wherein a device is located between the drive shaft (2) and the slide (7) to convert a rotational motion of the drive shaft (2) into a longitudinal shift of the slide (7).

3. A switchable clamp locking mechanism according to claim 1, wherein a ramp (20, 21) is provided on the slide (7) and an attachment is located on the drive shaft (2) for the ramp (20, 21) at a distance from an axis of the output shaft (3).

4. A switchable clamp locking mechanism according to claim 3, wherein the radially movable slide is provided with a triangular cutout (11) perpendicular to the drive shaft (2), and two adjacent walls of the triangular cutout each form one ramp (20, 21).

5. A switchable clamp locking mechanism according to claim 1, in which the slide (7) is radially movable inside a guide (9).

6. A switchable clamp locking mechanism according to claim 1, wherein the slide (7) is disengagable from the rotatably fixed part against a spring force of a spring (10).

7. A switchable clamp locking mechanism according to claim 1, wherein the slide (7) includes teeth (8) and the rotatably fixed part is formed as a housing (1) that includes teeth (6) that engage with each other to produce a form-locked connection.

* * * * *